Figure 5:
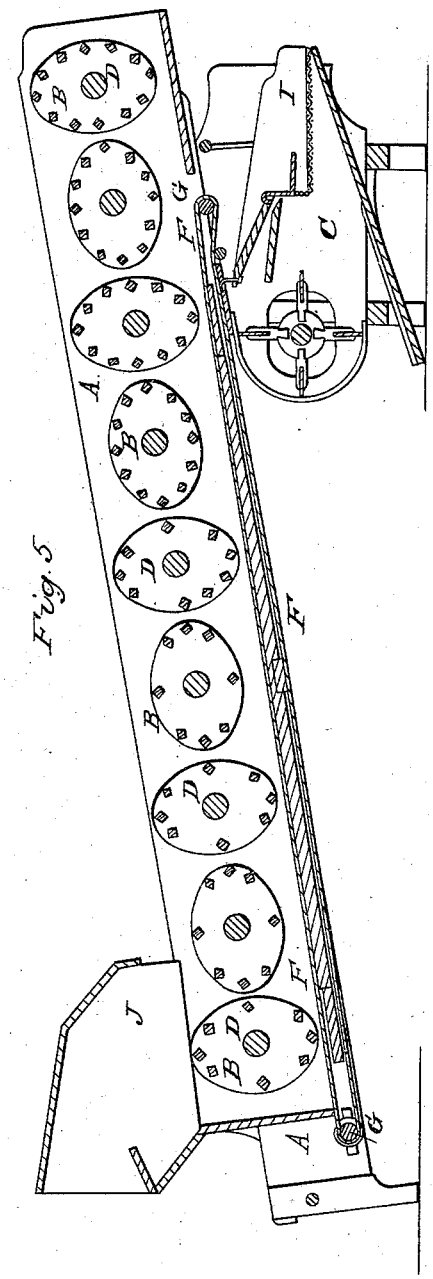

M. & C. B. PACKARD.
Thrashing Machine.
No. 3,832.
2 Sheets—Sheet 1.
Patented Nov. 18, 1844.
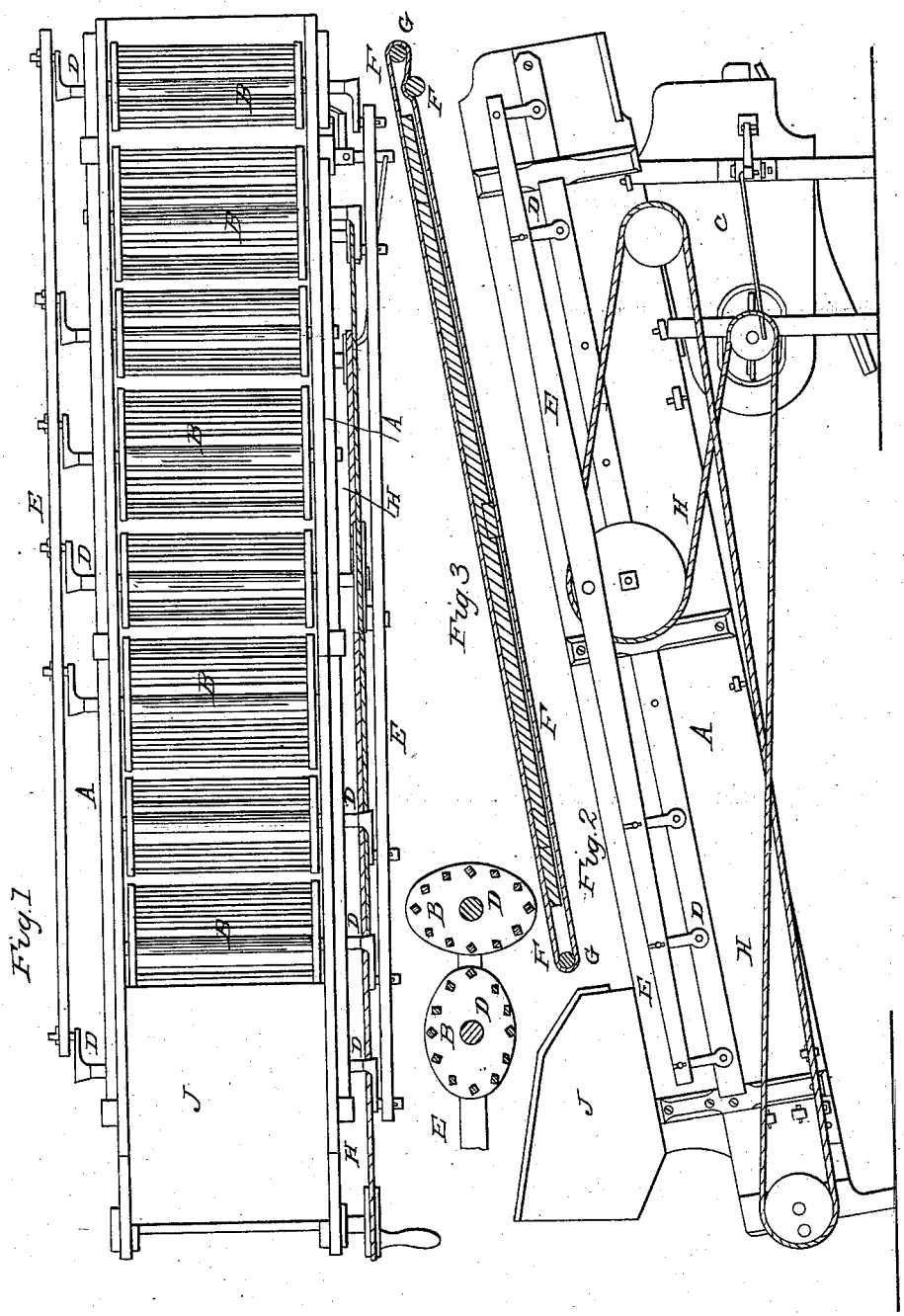

M. & C. B. PACKARD.
Thrashing Machine.

No. 3,832.

2 Sheets—Sheet 2.

Patented Nov. 18, 1844.

UNITED STATES PATENT OFFICE.

MANNING PACKARD AND CHRISTR. B. PACKARD, OF CLARENDON, NEW YORK.

MACHINE FOR SEPARATING GRAIN FROM STRAW.

Specification of Letters Patent No. 3,832, dated November 18, 1844.

*To all whom it may concern:*

Be it known that we, MANNING PACKARD and CHRISTOPHER B. PACKARD, of Clarendon, in the county of Orleans and State of New York, have invented a new and useful Improvement in Machines for Separating Grain from Straw After Being Threshed, which is described as follows, reference being had to the annexed drawings of the same, making part of this specification.

Figure 1 is a top view of the machine. Fig. 2 is a side elevation of do. Fig. 3 is a section showing the endless apron. Fig. 4 is a section showing two of the oval racks. Fig. 5 is a vertical longitudinal section of the machine.

Similar letters refer to corresponding parts.

In the use of Uriah Beebec's machine, and other machines containing revolving rakes, or fingers radiating from a revolving shaft, the machines are stopped in their operation on account of the straw getting between the teeth, in a longitudinal, and transverse position, and there becoming matted and twisted, and accumulated to such a degree, as to render inoperative the whole machine.

Our invention and improvement is designed principally to remove these difficulties, and this we accomplish by arranging in a suitable oblong frame A, standing at an angle of about 10 or 15 degrees, in alternate order, a number of oval racks B, upon which the straw and grain, are received from the threshing machine, against which said inclined plane is placed and tossed, or conveyed violently over the aforesaid revolving oval racks, to the winnowing machine C, placed under the upper or discharging end of the said conveyer, where the grain and chaff descend, and are separated, and cleaned, by the revolving fan, in the usual manner. While the straw is thrown off at the upper end of the inclined series of revolving oval racks—the parallel bars of said oval racks, being placed so near together, and the racks themselves revolving so close together, as to prevent the straw, getting between them, to choke them. The tossing, or shaking operation, is effected by so arranging the oval cribs, or racks, on their crank axles D, as to bring the transverse diameters or axes, of the alternate racks, in the same inclined plane, while the conjugate diameters or axes of the intermediate racks, are parallel, and at right angles, to the transverse axes aforesaid, and the cranks of the shaft or axes, of the several racks, being all connected together, at the same distance apart, and caused to revolve together, and at the same speed, by inserting the wrists of the cranks into corresponding apertures in a connecting bar E, placed outside the inclined frame and parallel thereto:—one on each side; so that while one is raised, the other is depressed, and so vice versa; thus equalizing the motion of the racks, and the strain on their cranks.

Combined with the aforesaid inclined revolving racks, is an endless revolving apron F, placed beneath the revolving racks to catch the grain and chaff that falls through the slats of the racks, and convey it to the winnowing machine.

The rollers G carrying the revolving apron, and the fan and crank shafts are turned by a band H, passed around pulleys on their axles, leading to the horse or other power:—the shoe I of the winnower, being shaken in the usual manner.

A bonnet or cap J, is placed over the lower or receiving end, of the conveyer, where it unites with the discharging end, of the threshing machine, to deliver the straw and grain correctly on to the oval conveyers, and shakers, and prevent its escape, or being thrown over, and beyond the sides of the conveyer.

What we claim as our invention and which we desire to secure by Letters Patent, is—

1. The combination and arrangement of the revolving oval racks, for conveying the straw, and separating the grain therefrom operated in the manner set forth, or other mode substantially the same.

2. We also claim, the combination of the revolving endless apron, with the before described revolving oval racks, arranged in the manner and for the purpose set forth.

MANNING PACKARD.
CHRISTOPHER B. PACKARD.

Witnesses:
JONATHAN HOWARD,
DANIEL RUSS.